(12) United States Patent
Sovell

(10) Patent No.: US 6,419,988 B1
(45) Date of Patent: *Jul. 16, 2002

(54) ABSORBENT IMPERVIOUS MAT FOR PROTECTION OF SURFACES

(75) Inventor: Ronald D. Sovell, Elko, MN (US)

(73) Assignee: RPM, Inc., Savage, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/694,457

(22) Filed: Oct. 23, 2000

Related U.S. Application Data

(63) Continuation-in-part of application No. 09/148,008, filed on Sep. 4, 1998, now Pat. No. 6,136,377.
(60) Provisional application No. 60/058,075, filed on Sep. 5, 1997.

(51) Int. Cl.[7] .................................................. B05D 3/02
(52) U.S. Cl. ..................................... 427/322; 427/393.4
(58) Field of Search .............................. 427/322, 393.4; 47/71

(56) References Cited

U.S. PATENT DOCUMENTS

| | | | |
|---|---|---|---|
| 357,698 A | * 2/1887 | Burrough | 47/71 |
| 5,290,269 A | 3/1994 | Heiman | 604/378 |
| 5,506,040 A | 4/1996 | Cordani | 428/218 |
| 5,679,145 A | * 10/1997 | Andersen et al. | 106/162.5 |
| 6,187,696 B1 | * 2/2001 | Lim et al. | 442/77 |

FOREIGN PATENT DOCUMENTS

JP 01293113 11/1989

OTHER PUBLICATIONS

Smit et al, Kunstst. Rubber (1993), 8, pp19–22 (Abstract).*

* cited by examiner

Primary Examiner—Erma Cameron
(74) Attorney, Agent, or Firm—Patterson, Thuente, Skaar & Christensen

(57) ABSTRACT

The invention utilizes an absorbent non-woven fabric impregnated on one side with vinyl backing for protecting furniture, floor surfaces, and decks from moisture, grease, or other matter emanating from a potted plant or other item situated upon the invention. The non-woven fabric absorbs and holds the moisture, grease, or other matter in place and promotes evaporation while the vinyl backing provides a non-skid surface and minimizes scratching, staining and damage to the surface underneath the invention.

10 Claims, 2 Drawing Sheets

ABSORBENT IMPERVIOUS MAT FOR PROTECTION OF SURFACES

This is a continuation-in-part application based on application Ser. No. 09/148,008, filed Sep. 4, 1998, issuing Oct. 24, 2000 as U.S. Pat. No. 6,136,377, and claiming priority to provisional application Ser. No. 60/058,075 filed Sep. 5, 1997. The invention herein is related to an application entitled Protective Cover, application Ser. No. 09/415,588; filed Oct. 8, 1999 which claimed priority from provisional application No. 60/103,503; filed Oct. 8, 1998, entitled Gun Cleaning Pad. The four above application (Ser. Nos. 09/148,008; 60/058,075; 09/415,588 60/103,503) and the issued patent, all of which have the same inventor; are hereby incorporated by reference into this application.

BACKGROUND OF THE INVENTION

The present invention relates to a new and improved protective mat for insertion between stationary placed items such as potted house plants, potted deck plants, barbeque grills and other items from which water, or other fluids and debris can be spilled, onto floors, table tops, decks and patios.

Mats for potted plants are typically made of non-absorbent materials such as plastic, glass, rubber, cork, etc. In addition, common objects such as plates or trays are used. Such devices and materials have significant shortcomings and disadvantages. The two major disadvantages being that some of these types can scratch or mar the table or floor surface it is placed on and secondly that they are of non-absorbent materials. Consequently, spilled or leaking muddy water can overflow and leak onto the table or floor and damage the surface. In the outdoor setting, such as for decks and patios, often nothing is used in between potted plants or barbeque grills and the deck or patio surface. This can cause damage to the deck or patio surface or create slippery and hazardous conditions.

SUMMARY OF THE INVENTION

This invention was created to solve the two most important shortcomings of mats that may be placed under potted plants or other stationary things that spill or generate moisture or grease or debris on decks, patios, table tops, and floors. One being absorbency, the other being protection of surfaces from scratching, or damage from water, grease or other spilled debris.

The invention utilizes an absorbent non-woven fabric impregnated on one side with waterproof vinyl backing for protecting furniture, floor surfaces, deck surfaces from moisture, grease, or other debris emanating from a potted plant situated upon the invention. The non-woven fabric absorbs and holds the moisture in place and promotes evaporation while the vinyl backing provides a protective non-skid surface and prevents soak through which minimizes staining and damage to the surface underneath the invention.

An advantage and feature of the invention is that the plant coasters may be cleaned in a washing machine and also dried in a clothes dryer.

A further advantage and feature of the invention is that moisture from the potted plant may be absorbed and hidden in the fiber mesh.

DETAILED SPECIFICATION

Figure 1:
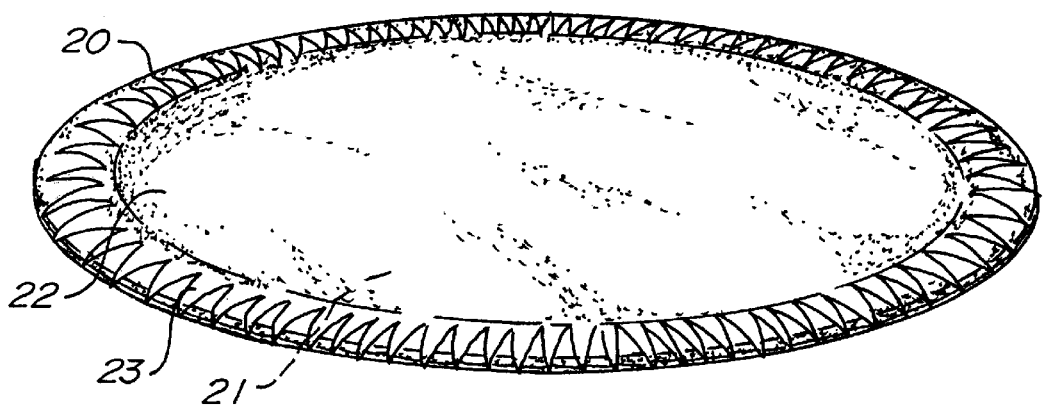
FIG. 1 shows a perspective view of the invention, as viewed from below.
Figure 2:
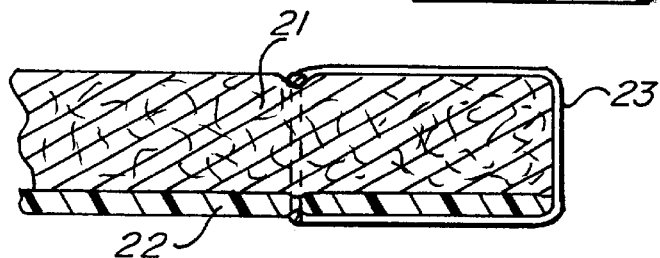
FIG. 2 shows an edge view of the invention.

Referring to FIGS. 1 and 2, the invention is shown and is generally designated with the numeral 20. The invention principally comprises a non-woven fabric 21 impregnated on a first side and a vinyl backing material 22 bonded to a second side.

The non-woven fabric is suitably formed in a conventional garnet machine that provides a uniform layer of randomly meshed acrylic fibers. The layer is then put into a needle loam which mechanically interlocks the randomly meshed fibers by needle punching the fiber into a stabilizing non-woven fabric sheet material that is readily flexible.

While in sheet form, non-woven fabric material 21 is coated with vinyl, to yield the vinyl backing material 22 on the second side. The vinyl backing material 22 is cured before further processing. In one embodiment, the vinyl backing material 22 is cured by heat from a gas-fired oven.

The fabric sheet is then cut to the finished size and shape which is circular in the preferred embodiment. Edge stitching 23 provides reinforcement and protection to the finished edge.

The vinyl backing material 22 is waterproof, functions as a moisture barrier for protection of the surface 25 underneath the invention and operates as a non-skid surface. The non-woven fabric 21 is absorbent and is capable of moisture dispersion and accelerating evaporation. Moreover, the fabric absorbs grease, moisture, and food without becoming slippery.

When used as a plant coaster 20, the invention is cut to a circular shape that generally conforms to the shape of the planter pot and is diametrically larger. The larger diameter of the plant coaster 20 in relation to the plant pot provides sufficient surface area for the absorption, evaporation and dispersion of any accumulated moisture emanating from the plant. When used as a grill mat, the mat is rectangular and may have rounded corners.

Figure 3:
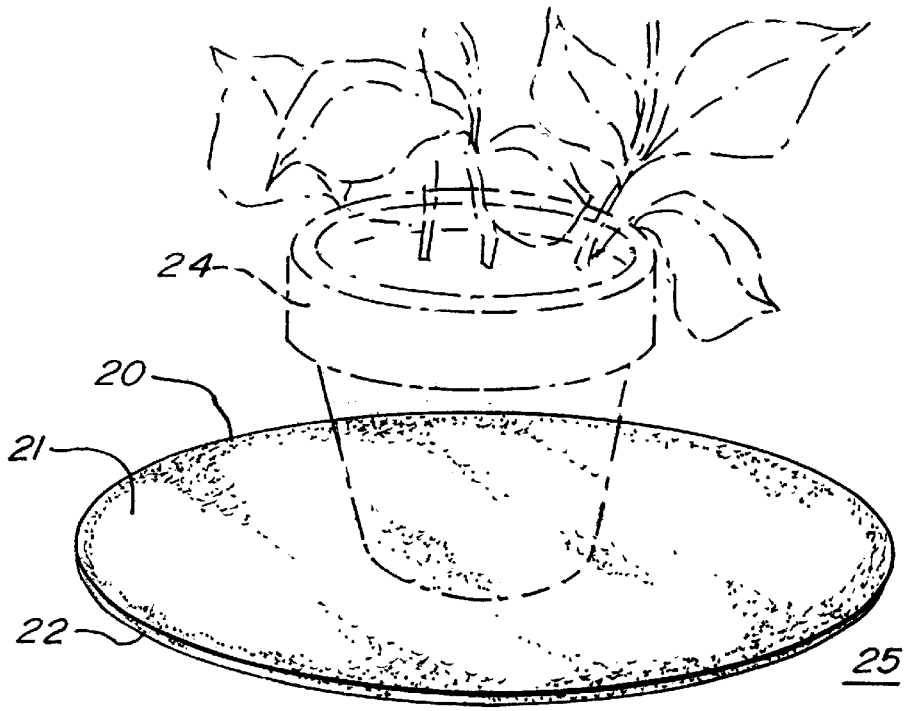
FIG. 3 shows the invention in use with an item potted plant illustrated by shadow lines.
Figure 4:
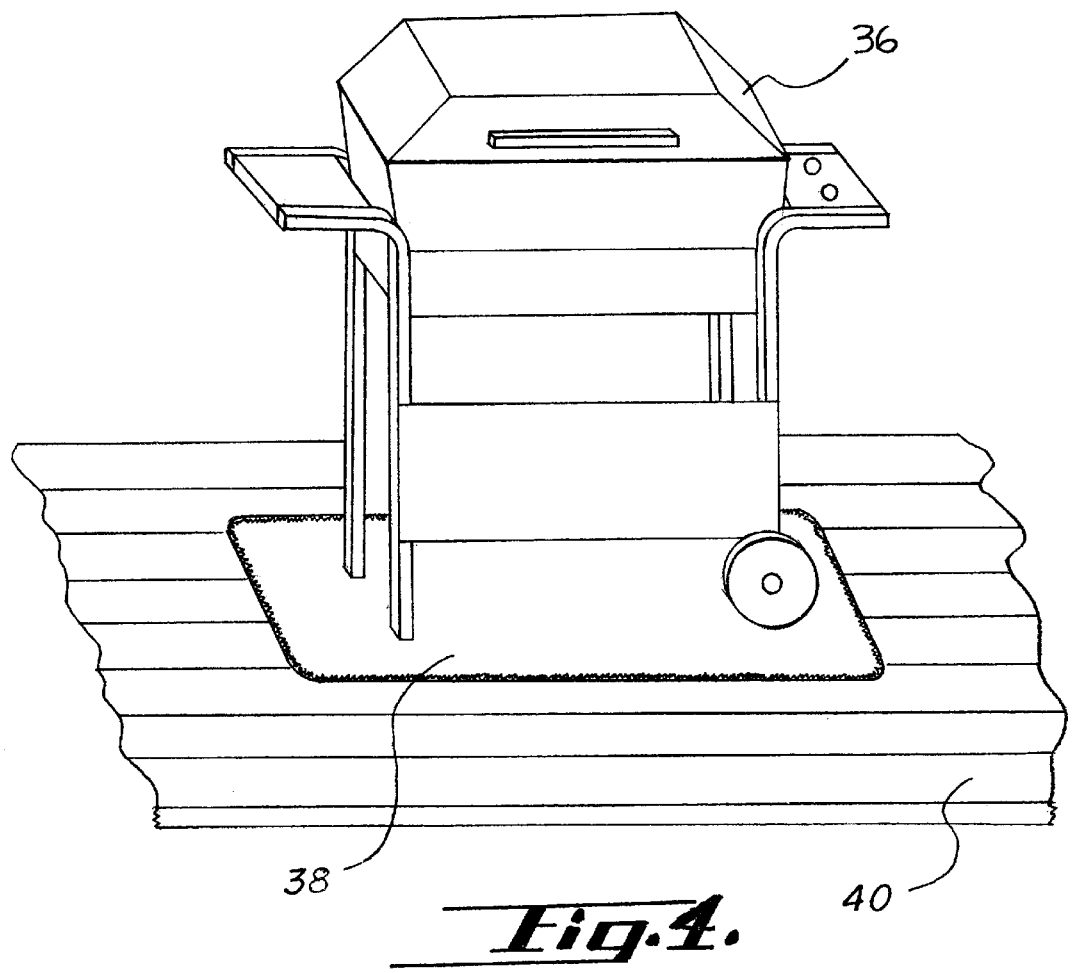
FIG. 4 is a perspective view of the invention in use with a gas grill.

Referring to FIGS. 3 and 4, in use, the plant coaster 20 is positioned underneath, and generally concentric with, the item such as the potted plant 24, or the gas grill 36. The generally rectangular mat 38 under the gas grill protects the decking 40. The invention is placed such that a significant portion of the non-woven fabric 21 is exposed to the atmosphere and the vinyl backing material 22 is in contact with the surface 25 to be protected.

Moisture, grease, food, or other matter from the item situated on the mat that ordinarily would stain and damage the surface 25 underneath the item, is suspended in the fibers of the non-woven fabric 21. Normal evaporation will cause said fabric to dry. Vinyl backing material 22 protects the underlying surface 25 from moisture damage.

The fiber material provides an excellent cushioning effect to prevent damage to the surface upon which it is placed as well as providing a moisture absorption capability. The thickness of the coaster in a preferred embodiment is 0.110 to 0.125 inches thick including the vinyl backing. The layer of cured vinyl backing is suitably 0.005 to 0.010 inches thick. The thickness of both the fabric material and vinyl can, of course, be varied.

In one preferred embodiment, the fibers are 100% acrylic. Alternatively, polyester or natural fibers may also be utilized in certain fabric mixes.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of manufacturing an absorbent impervious mat for protection of surfaces, the method comprising the steps of:
   a) combining a plurality of fibers in a layer;
   b) needle punching said layer to intertwine said fibers into a non-woven mesh;
   c) applying a flexible impervious to moisture layer of material to one side of the layer of fiber and leaving the other side with the fibers exposed;
   d) cutting the layer to a desired shape with a periphery; and
   e) applying stitching around the circular periphery of the layer of fiber.

2. The method of claim 1, further comprising selecting vinyl as the layer of impervious material.

3. The method of claim 1, further comprising the step of selecting acrylic fibers for combining into a layer.

4. The method of claim 1, further comprising the step of selecting heat curable vinyl as the layer of impervious material and further comprising the step of heat curing said vinyl.

5. The method of claim 1 further comprising the step of selecting a mixture of acrylic fibers and polyester fibers.

6. A method of manufacturing a flexible fiber layer for placement on floor surfaces or furniture for placement of a plant thereon comprising the steps of:
   a) combining a plurality of acrylic fibers in a layer with two sides;
   b) applying liquid vinyl to only one side of the layer; whereby the fibers on the otherside remain exposed;
   c) curing the liquid vinyl;
   d) cutting the layer with cured vinyl into a shape with a periphery; and
   e) stitching the periphery.

7. A mat for placement under a grill on a deck manufactured according to the process of claim 6.

8. A method of manufacturing a flexible fiber layer for placement on floor surfaces or furniture for placement of a plant thereon comprising the steps of:
   a) combining a plurality of acrylic fibers by needles punching into a layer with two sides;
   b) applying liquid vinyl to only one side of the layer; whereby the layers on the underside remain exposed;
   c) curing the liquid vinyl; and
   d) cutting the layer with cured vinyl into a shape with a periphery.

9. The method of manufacturing a flexible fiber layer of claim 8, further comprising the additional step of stitching the periphery.

10. A mat for placement under a grill on a deck manufactured according to the method of claim 8.

* * * * *